US009135306B2

(12) United States Patent
Boback et al.

(10) Patent No.: US 9,135,306 B2
(45) Date of Patent: Sep. 15, 2015

(54) SYSTEM FOR FORENSIC ANALYSIS OF SEARCH TERMS

(71) Applicant: Tiversa IP, Inc., Pittsburgh, PA (US)

(72) Inventors: Robert J. Boback, Moon Township, PA (US); Anju Chopra, Gibsonia, PA (US)

(73) Assignee: Tiversa IP, Inc., Pittsburgh, PA (US)

( * ) Notice: Subject to any disclaimer, the term of this patent is extended or adjusted under 35 U.S.C. 154(b) by 0 days.

(21) Appl. No.: 13/706,703

(22) Filed: Dec. 6, 2012

(65) Prior Publication Data
US 2013/0185293 A1 Jul. 18, 2013

Related U.S. Application Data

(60) Provisional application No. 61/568,924, filed on Dec. 9, 2011.

(51) Int. Cl.
*G06F 17/30* (2006.01)
(52) U.S. Cl.
CPC ...... *G06F 17/3053* (2013.01); *G06F 17/30702* (2013.01); *G06F 17/30887* (2013.01)
(58) Field of Classification Search
CPC ............ G06F 17/30804; G06F 17/30867; G06F 17/3061; G06F 17/30722; G06F 17/30861; G06F 17/30873; G06F 17/30876; G06F 17/30887; G06Q 30/02; H04L 63/1416; H04L 63/1408; H04L 63/145
USPC .............................. 707/101, 706, 758; 726/22
See application file for complete search history.

(56) References Cited

U.S. PATENT DOCUMENTS

| 7,440,915 B1 * | 10/2008 | Ulrich ............................. 705/35 |
| 2004/0220956 A1 | 11/2004 | Dillon |
| 2005/0054326 A1 * | 3/2005 | Rogers .......................... 455/410 |
| 2005/0278550 A1 | 12/2005 | Mahone et al. |
| 2007/0174630 A1 | 7/2007 | Shannon et al. |
| 2008/0034425 A1 | 2/2008 | Overcash et al. |
| 2009/0144102 A1 | 6/2009 | Lopez |
| 2009/0299843 A1 * | 12/2009 | Shkedi ....................... 705/14.25 |
| 2011/0055186 A1 | 3/2011 | Gopalakrishnan |
| 2011/0225138 A1 | 9/2011 | Johnston |

OTHER PUBLICATIONS

International Search Report and Written Opinion mail date Jun. 19, 2013 for International Application No. PCT/US2012/68138 for Tiversa IP, Inc. International Filing Date of Dec. 6, 2012 entitled System for Forensic Analysis of Search Terms, 10 pages.

* cited by examiner

*Primary Examiner* — Thu-Nguyet Le
(74) *Attorney, Agent, or Firm* — Cesari and McKenna, LLP

(57) ABSTRACT

A "data breach" or loss of sensitive data can cause an organization to lose revenues or suffer other damages. Analyzing data to locate a breach and to identify its source, however, is difficult because the data can come from many sources in an unstructured format and, typically, there is a large amount of data to analyze. A forensic analysis system, according to one embodiment, collects unstructured data from disparate sources, like the Internet, and peer-to-per filesharing and social media networks, and generates structured representations of the data, called virtual profiles. The system forms relationships among the virtual profiles. The system uses the virtual profiles and relationships to reduce the amount of information to be analyzed while including additional information that is related for analysis. By analyzing a smaller amount of related information, a cyber forensic analyst is better able to identify a data breach or other suspicious or illegal activity.

42 Claims, 13 Drawing Sheets

```
<?xml version="1.0" encoding="UTF-8"?>
<virtualprofile>
  <general>
    <virtualprofile_id>1</virtualprofile_id>
    <creation_date>2011-08-01</creation_date>
    <last_edit_date>2011-08-01</last_edit_date>
    <source_ip>1.1.1.1</source_ip>
  </general>
  <name>
    <prefix>Mr</prefix>
    <first_name>Bob</first_name>
    <middle_name/>
    <last_name>Smith</last_name>
    <suffix/>
    <mothersmaiden />
  </name>
  <addresses>
    <address>
      <street>123 Test Lane</street>
      <street2>Suite 300</street2>
      <city>Pittsburgh</city>
      <state>PA</state>
      <country>United States</country>
      <zip>15237</zip>
    </address>
  </addresses>
  <creditcards>
    <creditcard>
      <cardissuer>CardCardCo</cardissuer>
      <cardtype>Visa</cardtype>
      <number>4430-0000-0000-0000</number>
      <expirationdate>2015-08-01</expirationdate>
    </creditcard>
  </creditcards>
  <bankaccounts>
    <bankaccount>
      <accountissuer> Acme Bank </accountissuer>
      <accountname>Checking Account</accountname>
      <accountnumber>1008855</accountnumber>
      <accountbalance />
    </bankaccount>
  </bankaccounts>
<healthcareaccounts>
   <healthcareaccount>
     <accountgroup>08320127</accountgroup>
     <accountmemberid>GG0135435767001</accountmemberid>
     <accountrxplan>HC001</accountrxplan>
     <accountissuer>HealthCo</accountissuer>
   </healthcareaccount>
  </healthcareaccounts>
```

FIG. 4A 400
(Continued)

```
<phonenumbers>
   <phonenumber type="phone">7249409030</phonenumber>
   <phonenumber type="fax">7249409031</phonenumber>
</phonenumbers>
<driverslicenses>
   <driverslicense>
      <number>23555987</number>
      <state>PA</state>
   </driverslicense>
</driverslicenses>
<emailaddresses>
   <emailaddress>EMAIL@EMAIL.COM</emailaddress>
</emailaddresses>
<ssnidentifiers>
   <ssnidentifier>111 22 3333</ssnidentifier>
</ssnidentifiers>
<birthinfo>
   <month>06</month>
   <day>01</day>
   <year>1975</year>
</birthinfo>
```
⎫
⎬ 415
⎭

```
<documents>
   <document>
      <filename>test.doc</filename>
      <filesize>458631</filesize>
      <useragent>Limewire 4.12.8</useragent>
      <fileextension>doc</fileextension>
      <sha1>9164C08AEA6529FAEF069DF3CA2E501D3FE63130</sha1>
      <sha1base32>SFSMBCXKMUU7V3YGTXZ4ULSQDU76MMJQ</sha1base32>
   </document>
   <document>
      <filename>Chm  (Original).torrent</filename>
      <filesize>458631</filesize>
      <useragent>LimeWire/4.21.1 (rc)</useragent>
      <fileextension>torrent</fileextension>
      <sha1>8B6902403D5F5AE2646056A5DC88DF48811BB416</sha1>
      <sha1base32>RNUQEQB5L5NOEZDAK2S5ZCG7JCARXNAW</sha1base32>
   </document>
</documents>
</virtualprofile>
```
⎫
⎬ 410
⎭

SYSTEM FOR FORENSIC ANALYSIS OF SEARCH TERMS

CROSS-REFERENCE TO RELATED APPLICATIONS

The present application claims the benefit of U.S. Provisional Patent Application Ser. No. 61/568,924, which was filed on Dec. 9, 2011, by Robert J. Boback et al. for a System for Forensic Analysis of Search Terms and is hereby incorporated by reference.

BACKGROUND

Providing open and direct access to information, while protecting sensitive and confidential data is one of the greatest challenges facing companies and organizations. Despite a discerning need to control the flow of information into and out of private networks, increased government regulation, and rapidly evolving legislation, loss of sensitive data or "data breach" is still commonplace. Data breaches of any kind can impact companies and organizations in many negative ways including loss of revenue, damage to brand, litigation, and more.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating the example embodiments.

FIGS. 4A and 4B are collectively an XML document of an example virtual profile according to one convenient embodiment.

FIG. 5 is a screenshot of an example user interface for reviewing results.

FIGS. 10A and 10B are screenshots of an example user interface for managing contacts.

DETAILED DESCRIPTION OF EXAMPLE EMBODIMENTS

The Internet has enabled instant, ubiquitous, free, and easy access to many different types of unstructured data or information via search engine portals (Google, Yahoo), file sharing networks (Kazaa, BearShare, other peer-to-peer networks), social networks (Twitter, Facebook, MySpace, LinkedIn), and in other ways. Coming from such disparate sources, the information returned can take many different forms, such as web pages, computer data files, documents, images, videos, audio files, posts, tweets, and other forms that are not deterministic and unstructured. A forensic analysis system, according to one convenient embodiment, generates structured representations of the unstructured information originating from these various sources.

The system obtains one or more sets of search terms (or Boolean combinations thereof) provided by a client. The system then stores the search terms in a thesaurus (or thesauri). As a background process from the client's perspective, the system then continuously and iteratively reads the search terms from the thesauri and submits them as searches to a variety of disparate information sources (e.g., search engines, file sharing networks, social networks, etc.).

The system processes the results of the searches, and creates and updates structured data entities representing these results, even if the results themselves are unstructured. Each of the structured data entities identifies, for example, the file or file fragment returned from a search, the source of those files (e.g., an information source identifier), the location of the file, and other metadata extracted from the files. In some cases, the identified source is an Internet Protocol (IP) address or geographical location. The system then places the structured data entities into a data store, such as a relational database, along with other structured data.

Cyber forensic analysts or "CFAs," can then review search results by running queries against the structured data store. The queries may be related to looking for patterns in the data that may include detecting suspicious or illegal activity, such as a data breach, public posting of confidential information, exposure of credit card data, and other harmful information. The CFA can also select elements of the returned results and resubmit them to the data store. For example, if a stored record of interest indicates a data file is stored at a particular IP address, that IP address can be resubmitted to the data store to return a list of all files stored at that IP address.

A user interface(s) of the system provides other tools for the CFA to easily create tickets that notify the client of the results.

Figure 1:
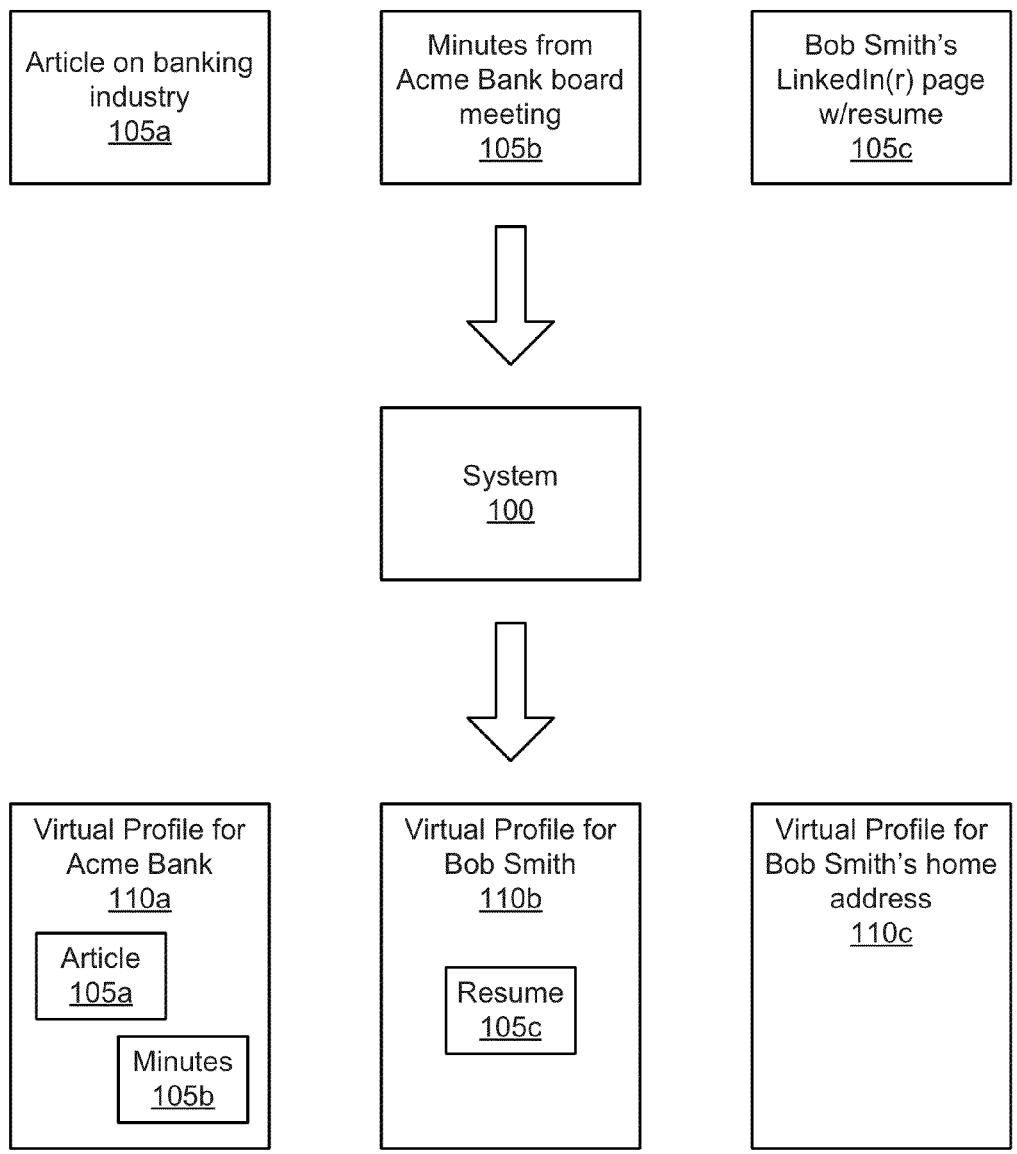
FIG. 1 is a block diagram of generalized unstructured and structured data.

Before describing the example embodiments in detail, FIG. 1 shows, in a generalized manner, examples of unstructured data and structured data generated from the unstructured data. In the example shown in FIG. 1, a system 100 collects unstructured data from various information sources, including the Internet (via Google), Kazaa filesharing network, and LinkedIn professional network. The unstructured data collected by the system 100 includes an article 105a on the banking industry that reviews Acme Bank and its competitors, minutes 105b from an Acme Bank board meeting, and a LinkedIn page 105c for Bob Smith, the CEO of Acme Bank, with his resume attached. Bob's resume also lists his home address.

With a more in-depth discussion to follow, from the collected unstructured data 105a-c, the system 100 creates structured data entities 110a-c, called "virtual profiles." Virtual profiles revolve around people, organizations, places, and ideas. In this example, the system 100 generates a virtual profile for Acme Bank 110a, which includes the banking industry article 105a and board meeting minutes 105b. The system also generates a virtual profile for Bob Smith 110b, which includes his resume, and a virtual profile for Bob's home address 110c.

Figure 2:
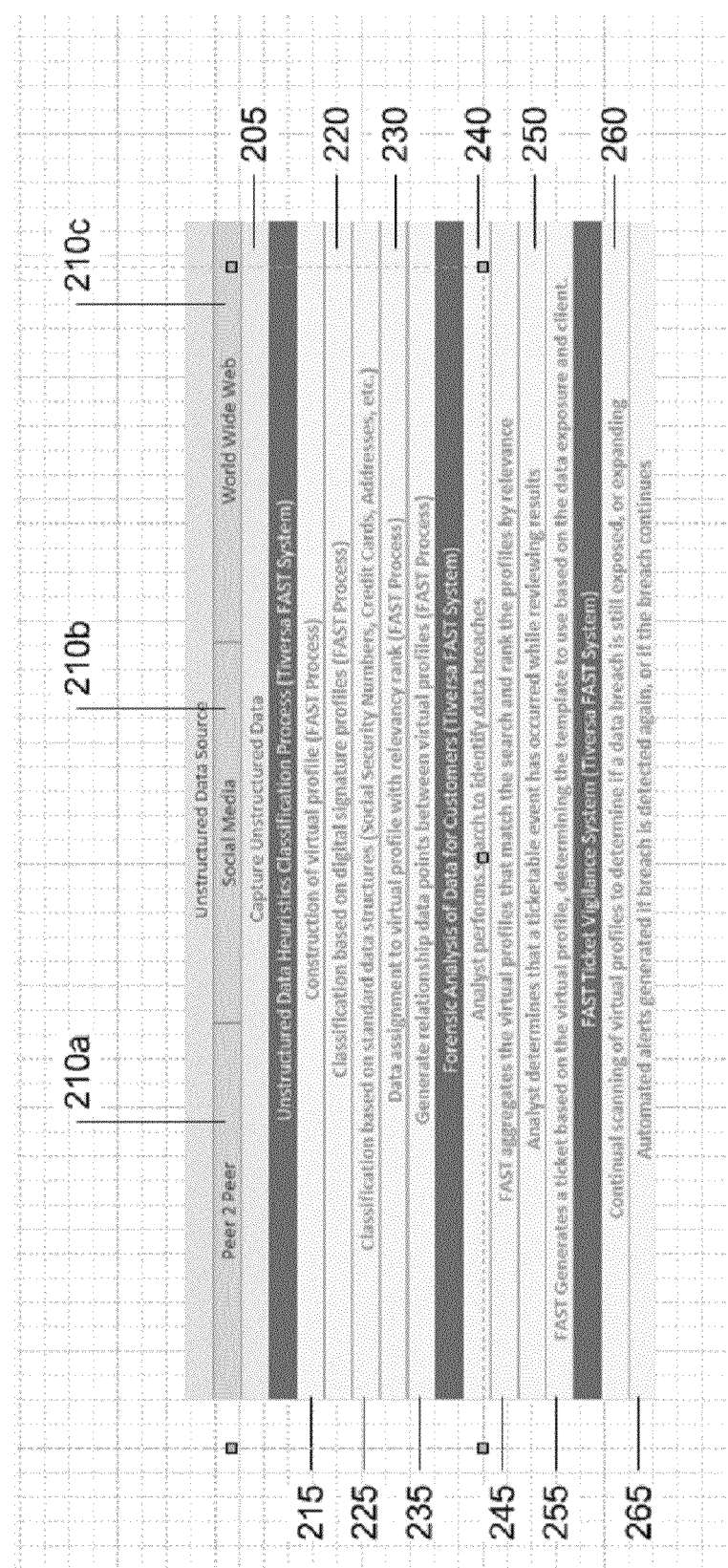
FIG. 2 is a block diagram of an example data flow according to one convenient embodiment.

FIG. 2 shows the data flow of an example process 200 according to one convenient embodiment. A high-level overview of the process 200 is provided first before a more detailed description is provided in the paragraphs below. Describing the process 200 at a high-level, the process 200 collects (205) unstructured data from data sources, including peer-to-peer network 205a, social media network 205b, and the World Wide Web 205c. The process 200 then creates/updates (215) virtual profiles from the collected unstructured data. The process 200 creates/updates (215) the virtual profiles for people, organizations, places, and ideas.

The process 200 classifies (220) the virtual profiles by a digital signature profile or "DSP," which includes search terms and/or patterns. In one convenient embodiment (described below in greater detail) the process 200 uses a DSP that is specific to a client to identify a subset of the virtual profiles that are relevant to that client. Optionally, the process 200 classifies (225) the virtual profiles by standard data structures, such as Social Security numbers, credit card numbers, addresses, and other personal identifiable information.

The process 200 assigns (230) relevancy rankings to the unstructured data associated with the virtual profiles. The relevancy ranking of a given unstructured data indicates to what degree that data bears on the associated virtual profile. The relevancy ranking may then be used to determine whether the virtual profile and data are returned to a cyber forensic analyst (CFA) for analysis. In one convenient embodiment (described below in greater detail) relevancy may be determined by a client specific DSP.

The process 200 generates (235) "relationships" among the virtual profiles. The relationships are formed by one or more points of commonality and, in embodiment, may be weighted. The relationships may then be used to include other virtual profiles among the virtual profiles that are returned to the CFA for analysis. The above process steps 215-235 represent work related to unstructured data heuristics classification.

While the process 200 is operating, the CFA performs (240) a search against the virtual profiles. The search may include search terms and/or patterns from a DSP (or DSP list) that are specific to a client. The process 200 aggregates (245) virtual profiles that match the CFA's search and then ranks the virtual profiles by relevance. Results of the process 200 include the ranked virtual profiles.

The CFA reviews (250) the results and determines whether a "ticketable event" has occurred. For example, the CFA looks for patterns that are indicative of suspicious or illegal activity, such as a data breach, public posting of confidential information, exposure of credit card data, and other harmful information.

In response to the CFA determining that a ticketable event has occurred, the process 200 generates (255) a ticket based on the virtual profile. Optionally, the process 200 determines which template to use to generate the ticket based on the data exposed and the client. The above process steps 240-255 represent work related to forensic analysis of data for customers (or clients).

The process 200 continues scanning (260) for virtual profiles to determine if suspicious or illegal activity is still occurring or is increasing. For example, every 24 hours or some other period of time, the process 200 repeats the process steps 215-235. The process 200 generates (265) automated alerts that notify the CFA (or the client) when suspicious or illegal activity is detected again or still occurring. For example, the process 200, uses a client specific DSP to perform a search against virtual profiles that were created/updated in the previous 24 hours (or some other period of time). The above process steps 260 and 265 represent work related to ticket vigilance.

Having provided a high-level description of the process 200, a more detailed description of the process and corresponding system, and their embodiments are provided immediately below.

Figure 3:
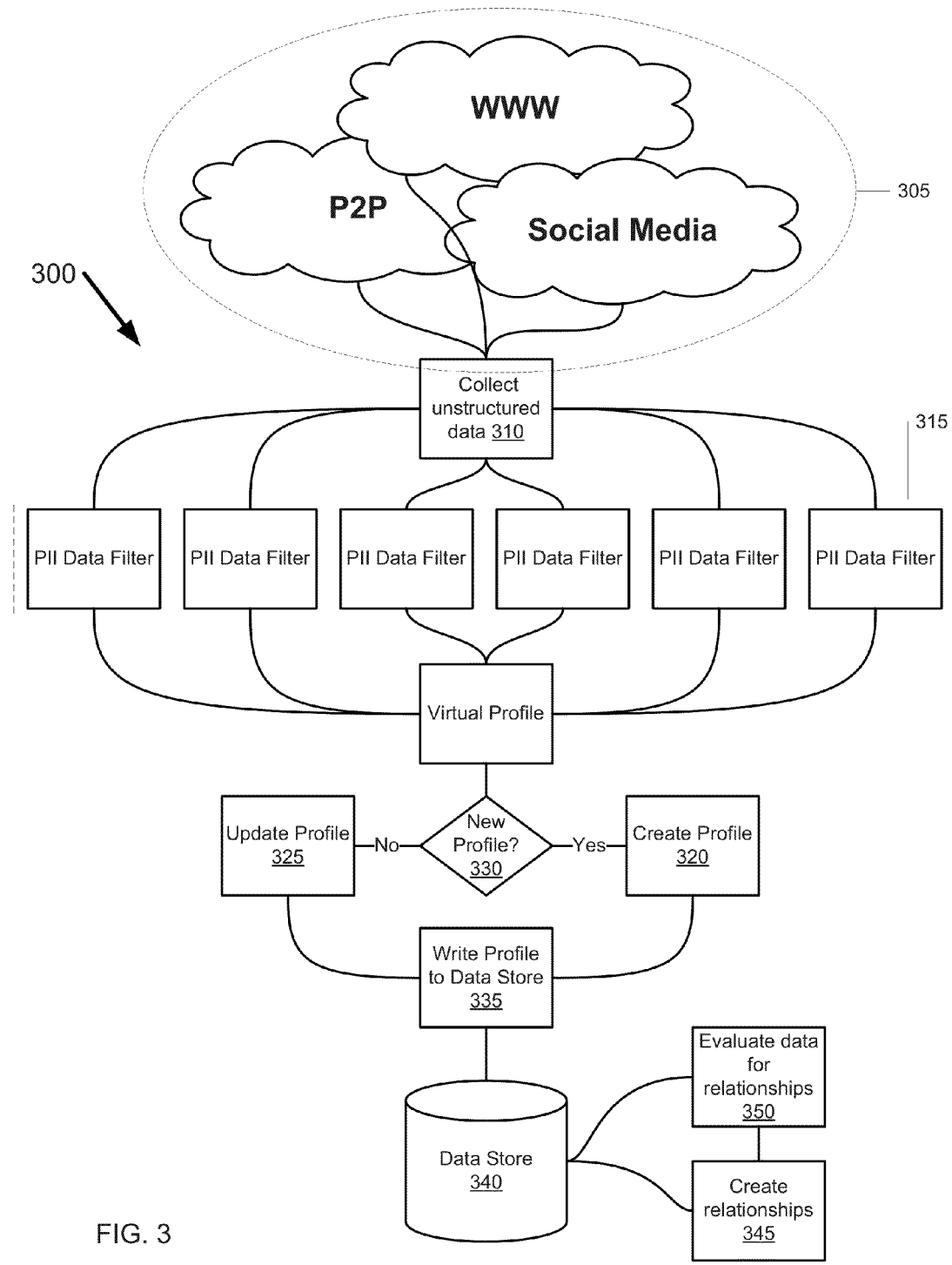
FIG. 3 is a flow chart of an example process carried out by a system according to one convenient embodiment.

FIG. 3 shows an example process 300 carried out by a system according to another convenient embodiment. In practice, the system collects (310) unstructured data from various sources 305 (e.g., the World Wide Web, and peer-to-peer and social media networks) with and without regard to a particular search term or terms. Operating in one mode, the system collects whatever data is available from the sources 305. An example data collection procedure implemented by the system is as follows.

The system searches for data to collect using file extension searching. For example, the system searches for data with the "doc" file extension. In response to the file extension searching, the system receives results or "hits" from a remote client indicating data having the "doc" file extension, e.g., "test.doc." In one example, the system searches for over 500 different file extensions resulting in a slew of potential data to download.

After the hits are reviewed, the system tells the remote client that the system is behind a firewall and that the remote client needs to contact the system to start a download, this is called a "PUSH." At this point, the remote client connects to the system or a portion of the system, e.g., a downloader or system element executing downloader software.

The system queries the remote client asking for files being shared by the remote client. This is called a "browse host request." If the remote client allows the system to view files that are shared and to download these files (i.e., the remote client has browse host functionality and the functionality is enabled), the system records the available files. The system prioritizes the files being shared by the remote client.

The system then downloads the available files from the remote client using an HTTP GET request, the format of which is "/get/[file_id]/[filename]." For example, the system downloads a file named "rhubarb_pie.rcp" with the request:

GET /get/293/rhubarb_pie.rcp
HTTP/1.0 User-Agent: gnutella.
(required empty line)

The system continues to download files from the remote client for as long as the system and remote client stay connected, and there are files available to download from the remote client.

Operating in another "directed search" mode, the system uses search terms to search the sources 305 for unstructured data referencing one or more of the terms. The search terms used by the system include general and specific terms. In practice, general search terms may be associated with an industry or business sector. For example, terms related to the banking industry include "statement," "deposit," "withdraw," etc. Specific search terms may be related to a particular client. For example, terms related to client "Acme Bank" include Acme Bank statements, Acme Bank account number, Acme Bank board members, etc.

The system, according to another embodiment, continuously and iteratively reads the search terms from a thesaurus or thesauri, which stores the search terms, and submits them as searches to the various information sources. According to yet another embodiment, the foregoing is performed as one or more background processes.

The data collected by the system is in an unstructured format, meaning the data does not have a pre-defined data model and/or does not fit well into relational tables. Typically, unstructured data is text-heavy but may contain information such as dates, numbers, and facts to name a few. Unstructured data is contrasted with data that is stored in fielded form in databases or annotated (semantically tagged) in documents.

The system collects (310) a large amount of unstructured data, typically, on the order of gigabytes and terabytes. Because analyzing such a large amount of data may impractical and/or inefficient, it may be useful to process the collected unstructured data and prepare the data for analysis. Previously described at a high-level as the process steps 215-235 (unstructured data heuristics classification) of FIG. 2, the processing of unstructured data is described in greater detail below.

To prepare the unstructured data for analysis, the system parses (315) the unstructured data for any personal identifiable information. Personal identifiable information includes name, date-of-birth, address, Social Security number, credit card number, and other information that can be used to uniquely identify, contact, or locate a single person or can be used with other sources to uniquely identify a single individual.

FIG. 3 shows multiple filters (working in a parallel or in series) extracting personal identifiable information from the unstructured data. The system uses patterns, called "regular expressions," literals, dictionary or a combination thereof, to search the unstructured data for personal identifiable information. For example, the system uses a regular expression representing credit card numbers to search the unstructured data for credit card numbers (e.g., the regular expression ^4[0-9]{12}(?:[0-9]{3})?$. matches VISA credit card numbers). According to some embodiments, the system also uses a dictionary of names (or other personal identifiable information that cannot be expressed as a pattern) to find names in the unstructured data.

From the extracted personal identifiable information, the system creates (320) virtual profiles and updates (325) existing virtual profiles. A virtual profile is a structured data entity that the system creates for a person, organization, location, or idea. A virtual profile contains information (or attributes), such as name, address, Social Security number, bank information, health information, tax information, interest, correspondence, image, and video to name a few. Creating and updating a virtual profile is described, in detail, immediately below with reference to FIG. 3 and FIGS. 4A and 4B.

FIG. 4A together with FIG. 4B show an example virtual profile 400 for Bob Smith, which is encoded as an Extensible Markup Language (XML) document according to one example embodiment. The system collects (310) unstructured data "test.doc" and "Chm (Orignal).torrent" from a source having an Internet Protocol (IP) address of 1.1.1.1. The source of the unstructured data is represented in the virtual profile 400 as source element 405 and the unstructured data are represented as unstructured data element 410. As shown, the unstructured data element 410 records the filenames, file types, and other attributes related to the unstructured data. In one convenient embodiment, the unstructured data element 410 includes a copy or a reference, such as a hyperlink, to a copy of the unstructured data.

The unstructured data, "test.doc" and "Chm (Orignal).torrent," have information about Bob Smith, namely, his name, address, credit card, bank account, health insurance, phone number, driver's license, e-mail address, social security number, and birthday. The system extracts this information by filtering "test.doc" and "Chm (Orignal).torrent," for personal identifiable information, as described above in reference to FIG. 3. The system records the extracted information in the virtual profile 400 as personal identifiable information element 415.

The example shown in FIG. 4 demonstrates the system creating the virtual profile 400 from different instances personal identifiable information. In some cases, the system creates or updates a virtual profile from a single instance of personal identifiable information. For example, when the system finds a name of a person in the unstructured data, the system creates a virtual profile for that person with the person's name.

In other cases, the system creates or updates a virtual profile from more than one instance of personal identifiable information. For example, when the system finds a Social Security number in unstructured data, the system attempts to find (in the unstructured data) the name of a person to whom the number belongs before creating or updating a virtual profile.

In still other cases, the system stores personal identifiable information in list instead of creating a virtual profile. For example, when the system finds a phone number but cannot find other personal identifiable information that indentifies the person to whom the number belongs, the system stores the phone number in a list, called an "orphan list."

Returning to FIG. 3, the system uses the personal identifiable information obtained from the unstructured data, together with the source of that information to determine (330) whether to create (320) a new virtual profile or to update (325) an existing virtual profile. For example, the system finds Bob Smith's Social Security number in unstructured data collected from a source having an IP address of IP-1. The system searches existing virtual profiles for a virtual profile for Bob Smith having personal identifiable information also collected from the source at IP-1, written in shorthand as "virtual profile for Bob Smith at IP-1." If the system finds the virtual profile for Bob Smith at IP-1, then the system updates the profile by adding Bob Smith's Social Security number to the profile. If the system does not find the virtual profile for Bob Smith at IP-1, then system creates a new virtual profile for Bob Smith at IP-1.

There may be cases in which there is more than one virtual profile for a person, organization, place, or idea with personal identifiable information collected from different sources. For example, the system creates a virtual profile for Bob Smith at IP-1 and creates another virtual profile for Bob Smith at IP-2. The system may create multiple virtual profiles for apparently the same person, organization, place, or idea, because of, so-called, "IP shift." The source of the personal identifiable information is dynamically assigned its IP address and from time to time, the source is assigned a new IP address, i.e., the source's IP address shifts. Rather than determining whether it is the same source but at different IP addresses, the system creates virtual profiles at each of the IP addresses and, as described in greater detail below, forms a relationship among the virtual profiles created. In the example above, the system forms a relationship between the virtual profile for Bob Smith at IP-1 and virtual profile for Bob Smith at IP-2.

In one convenient embodiment, the system tracks the source of personal identifiable information so that a client can be notified of the source and/or the source can be removed to mitigate the effects of the source making personal identifiable information available to others.

Continuing with FIG. 3, the system writes (335) virtual profiles to a data store 340, such as a SQL database. The system continually creates and updates virtual profiles as the system collects unstructured data and filters the data for personal identifiable information, as represented by the steps 310 through 335.

Virtual profiles are not necessarily tied to a specific client. As described above, the system also collects unstructured data that did not result from a directed search using search terms. Without search terms to collect unstructured data relating to a specific client, virtual profiles created from such collected data are not tied to a specific client.

In one convenient embodiment, the system performs a classification step to tie virtual profiles to a specific client. The system (or an operator/user of the system) runs a list of search terms relating to a specific client, called a thesaurus or digital signature profile (DSP) list, against the virtual profiles to classify a subset of the virtual profiles that are relevant to the client. Digressing briefly, the system may use a similar DSP list in a directed search to collect unstructured data making reference to one or more search terms relating to a specific client.

In practice, the system performs the foregoing classification step to establish an initial set of virtual profiles or "baseline" for a client. The system then uses the same DSP to collect unstructured data and to create/update a subsequent set of virtual profiles. This subsequent set of virtual profiles is compared to the baseline.

Differences among the sets of virtual profiles may be used to characterize suspicious or illegal activity. For example, one source of personal identifiable information may be identified from the baseline, while additional sources may be identified from the subsequently created/updated virtual profiles. The increased number of sources making information available, as measured from the baseline to the subsequently created/updated virtual profiles, may be indicative of a larger and/or growing data breach.

In another convenient embodiment, the system classifies the virtual profiles based on standard data structures, such as Social Security numbers, credit card numbers, addresses, and other personal identifiable information. For example, patterns, called "regular expressions," representing credit card numbers, phone numbers, Social Security number, and other personal identifiable information are applied to the virtual profiles to identify those virtual profiles recording such information.

The system, according to another convenient embodiment, determines how relevant a document is to the search term of interest. For example, documents making direct reference to a search term are more relevant to the search term of interest than those documents making only a passing or indirect reference.

The system then ranks the unstructured data by their relevancy. In some example embodiments, relevancy ranking of data may be used to determine (or limit) which data are used to create/update virtual profiles and to determine which virtual data are to be analyzed. For example, an operator or user of the system may only want to create/update virtual profiles from unstructured data having relevancy rankings greater than forty percent. Unstructured data that are less than forty percent relevant are not used to create/update virtual profiles. It may be useful to limit a number of virtual profiles created/updated by the system for system performance reasons.

In one convenient embodiment, relevancy is defined by a DSP list, which is also used to collect unstructured data. As described above, the DSP list includes search terms and/or patterns that are specific to a client. In addition to collecting unstructured data, the system can also use the DSP list to classify a subset of the virtual profiles that are relevant to the client. As such, both DSP and relevancy are said to be tied to a client.

The system uses a client specific DSP to return and rank, for analysis, virtual profiles that are of interest to that client. Consider the example of two clients, a bank and an identity theft protection service. The bank is interested in identifying exposed or "leaked" bank card numbers. Accordingly, a DSP for the bank includes a pattern representing bank card numbers issued by that bank. The identity theft protection service is interested in identifying any leaked personal identifiable information (which also includes bank card numbers). Accordingly, a DSP for the identity theft protection service includes patterns representing personal identifiable information, such as address, date of birth, etc.

The system uses the DSPs to search virtual profiles including a first virtual profile for Bob Smith with Bob's bank card number and second virtual profile for Bob Smith with Bob's home address. Using the DSP specific to the bank, the system returns the first virtual profile ranked higher than the second virtual profile because Bob's bank card number (from the first virtual profile) matches the bank-specific DSP. Bob's address from the second virtual profile does not match the bank-specific DSP, and, thus the system ranks the second virtual profile lower than the first virtual profile. In comparison, using the DSP specific to the identity theft protection service, the system returns the first and second virtual profiles, and ranks the profiles similarly because both Bob's bank card number (from the first virtual profile) and home address (from the first virtual profile) match the DSP for the identity theft protection service.

In the example embodiments, there is not necessarily a correspondence between a number of search terms used to find unstructured data and a number of virtual profiles created and updated from the date found. For example, a search for "Acme Bank" returns unstructured data referencing Acme Bank, including a LinkedIn page for Bob Smith that lists "CEO of Acme Bank" as Bob's occupation. The system creates a virtual profile for Acme Bank (e.g., the virtual profile 110a of FIG. 1) and a virtual profile for Bob Smith (e.g., the virtual profile 110b of FIG. 1).

According to one of these embodiments, the system creates and updates virtual profiles for people, organizations, places, and ideas that are "related" to a search even through the search does not include those people, organizations, places, or ideas. In the example above, a search for "Acme Bank" returns Bob Smith's LinkedIn page because the search term "Acme Bank" appears in the unstructured data (i.e., the phrase "CEO of Acme Bank" matches the search term "Acme Bank").

The system parses the LinkedIn page and filters out Bob Smith's name. The system creates a virtual profile for Bob Smith even though his name is not a search term. The system then "relates" the virtual profile for Bob with the virtual profile for Acme Bank, as explained immediately below.

Continuing with FIG. 3, the system creates (345) relationship models or "relationships" among the virtual profiles. The system forms (345) the relationships using one or more points of commonality, such as common interest, geographical location, demographics, and financial information to name a few. In one convenient embodiment, these and other points of commonality are defined (e.g., by an operator or user of the system) when a client establishes an account with the system. In the example above, the virtual profile for Bob Smith and virtual profile for Acme Bank have "Acme Bank" in common. As such, the system forms a relationship among the virtual profile for Bob Smith and virtual profile for Acme Bank.

In one convenient embodiment, the system reads virtual profiles stored in the data store 340 to create (345) relationships among the profiles and then stores the relationships in the data store 340.

Once the relationships among the virtual profiles are created, the system then evaluates (350) the relationships. For example, system determines how related virtual profiles are to one another or their "relatedness." Another word for relatedness is correlation. Factors for determining relatedness include how many points of commonality being considered and how many of those points are shared among the virtual profiles. The relatedness or correlation of relationships can be qualified (e.g., "strong" or "weak") or quantified by a numerical value (e.g., on a scale of 1 to 100). It is also possible to both qualify and quantify the relatedness of relationships. Accordingly, relationships may be characterized by "strength" or "degree" for the purpose of comparing relationships.

For example, compare first and second virtual profiles for Bob Smith in which Bob's name and Social Security number are common to both profiles, and a third virtual profile in which only Bob's name is common to all three profiles. The first virtual profile also includes Bob's telephone number, which is not common to either the second or third virtual profile. In this example, the first and second virtual profiles are more related to each other, with two out three elements in common, than the first and third virtual profiles, with one out of three elements in common.

In the above example, it may be said that there is a "strong" relationship between the first and second virtual profiles and there is a "weak" relationship between the first (or second) and third virtual profiles. It may also be said that the relationship between the first and second virtual profiles is stronger than the relationship between the first (or second) and third virtual profiles.

In another example, the system creates two virtual profiles for Bob Smith from unstructured data collected from two different sources. Each of the virtual profiles has Bob's name as the sole element. Before continuing with the example, it is important to note that the system maintains both virtual profiles for Bob Smith, even if they have the same information and may be duplicates.

Continuing with the example, the two virtual profiles for Bob Smith are related because they both include Bob's name. The system creates a relationship between the virtual profiles. The "strength" or "degree" of this relationship, however, is less than the "strength" or "degree" of the relationship between the first and second virtual profiles of the prior example. The first and second virtual profiles of the prior example have more elements in common (two) than the two virtual profiles of the present example (one).

In one convenient embodiment, the system uses the "strength" or "degree" of relationships among virtual profiles to rank virtual profiles that the system returns for analysis. For example, virtual profiles with a "stronger" relationship are ranked higher than those virtual profiles with a "weaker" relationship.

In one convenient embodiment, the system reads virtual profiles stored in the data store 340 to evaluate (350) relationships.

Having discussed virtual profiles and relationships among the virtual profiles, the discussion now turns to the analysis of virtual profiles, which was previously highlighted in FIG. 2, as process steps 240-255 (forensic analysis of data for customers).

Figure 5:
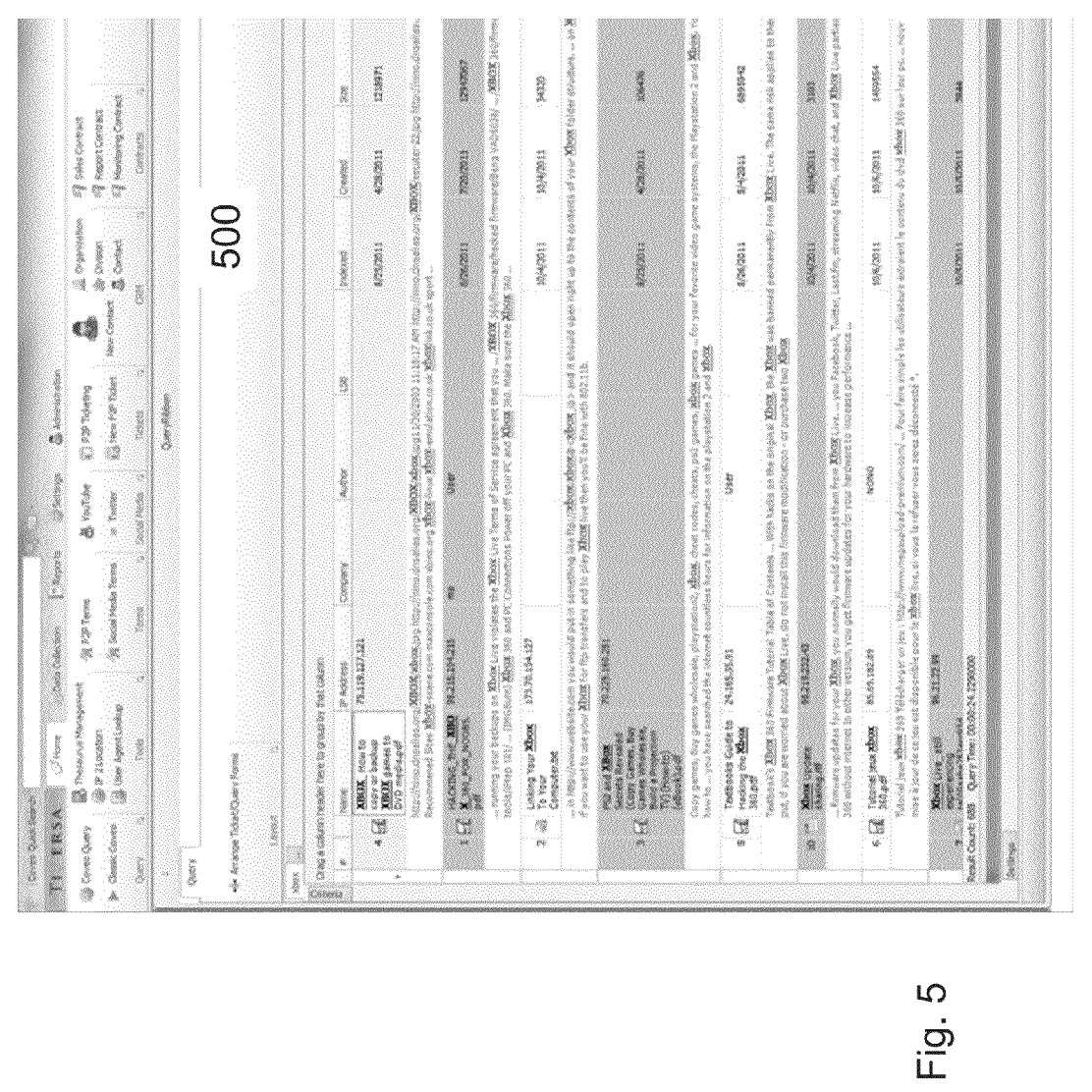

The system uses the virtual profiles and relationships among the virtual profiles to provide a cyber forensic analyst or "CFA" with information to analyze. In operation, the CFA (or in some cases, the system) runs a search (e.g., a DSP list of search terms and/or patterns) against the virtual profiles. The system, using the virtual profiles and relationships, returns a "result set" that includes information that is the subject of the search and information that is related to the search, referred to as "related information." The result set may by the provided to the CFA through a "results screen" or "results page," such as the results screen 500 shown in FIG. 5.

The system uses the virtual profiles and relationships to reduce the amount of information to be analyzed while including additional information that is related for analysis. By analyzing a smaller amount of information that includes related information, a cyber forensic analyst is better able to identify a data breach or other suspicious or illegal activity. For example, the source of a data breach of an organization is often an individual, who may or may not be a member of that organization. A review of information concerning the organization and, well as, a review of information related to the organization, such as information concerning outside suppliers, may yield the identity of the source of the data breach.

In one convenient embodiment, the system aggregates virtual profiles that match a search and ranks the virtual profiles by relevance. The relevancy ranking of virtual profiles may be used to determine (or limit) which virtual profiles and their corresponding information are reviewed by the CFA.

Figure 6:
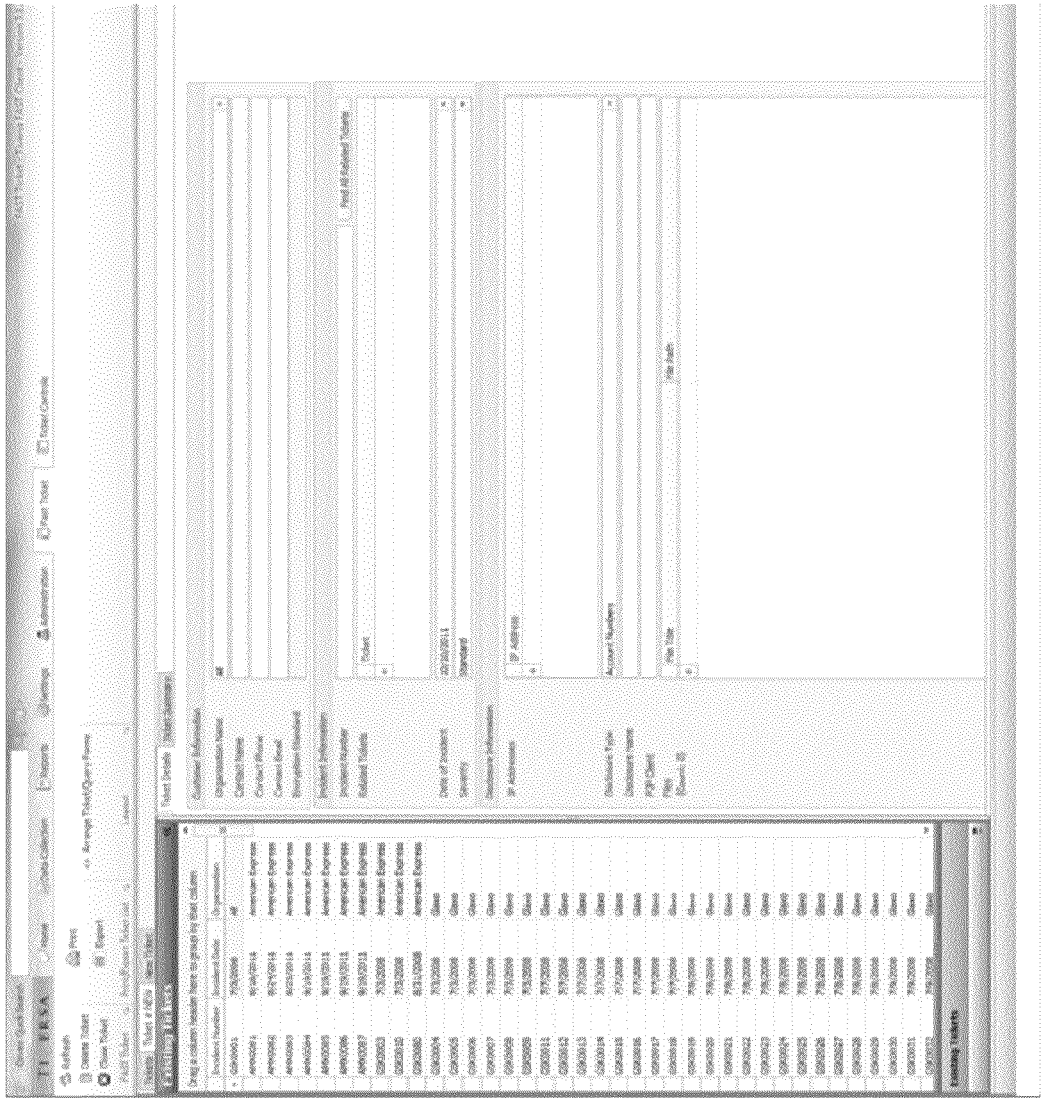
FIG. 6 is a screenshot of an example user interface for ticketing.

The CFA reviews the information looking for patterns, signs, digital fingerprints, etc., that are indicative of suspicious or illegal activities, such as data breaches. If the CFA determines that suspicious or illegal activity is occurring or has occurred, referred to as "ticketable event," the system generates a ticket that notifies the client of the result of the CFA's analysis. The CFA may review (and/or edit) the ticket using a "ticketing screen" like the ticketing screen 600 shown in FIG. 6.

According to one embodiment, the system generates the ticket based on the virtual profile(s) searched by the CFA. In this embodiment, the system determines which template to use to write the ticket based on data exposure and the client.

Continuing the discussion of the process steps 260 and 265 of FIG. 2 (ticket vigilance), once a ticketable event is identified, reviewed, and the client is informed of the event, the system monitors the event to determine if it reoccurs or expands. For example, the system continually scans virtual profiles to determine if a data breach is still exposed or expanding. The system generates an alert, automatically, if the data breach is detected again or if the breach continues.

In some applications of the example embodiments, the CFA may be a human or a computer running a program for identifying suspicious or illegal activities, such data breaches. In one application, the CFA is a human using a computer running a program for identifying suspicious or illegal activities.

Figure 7:
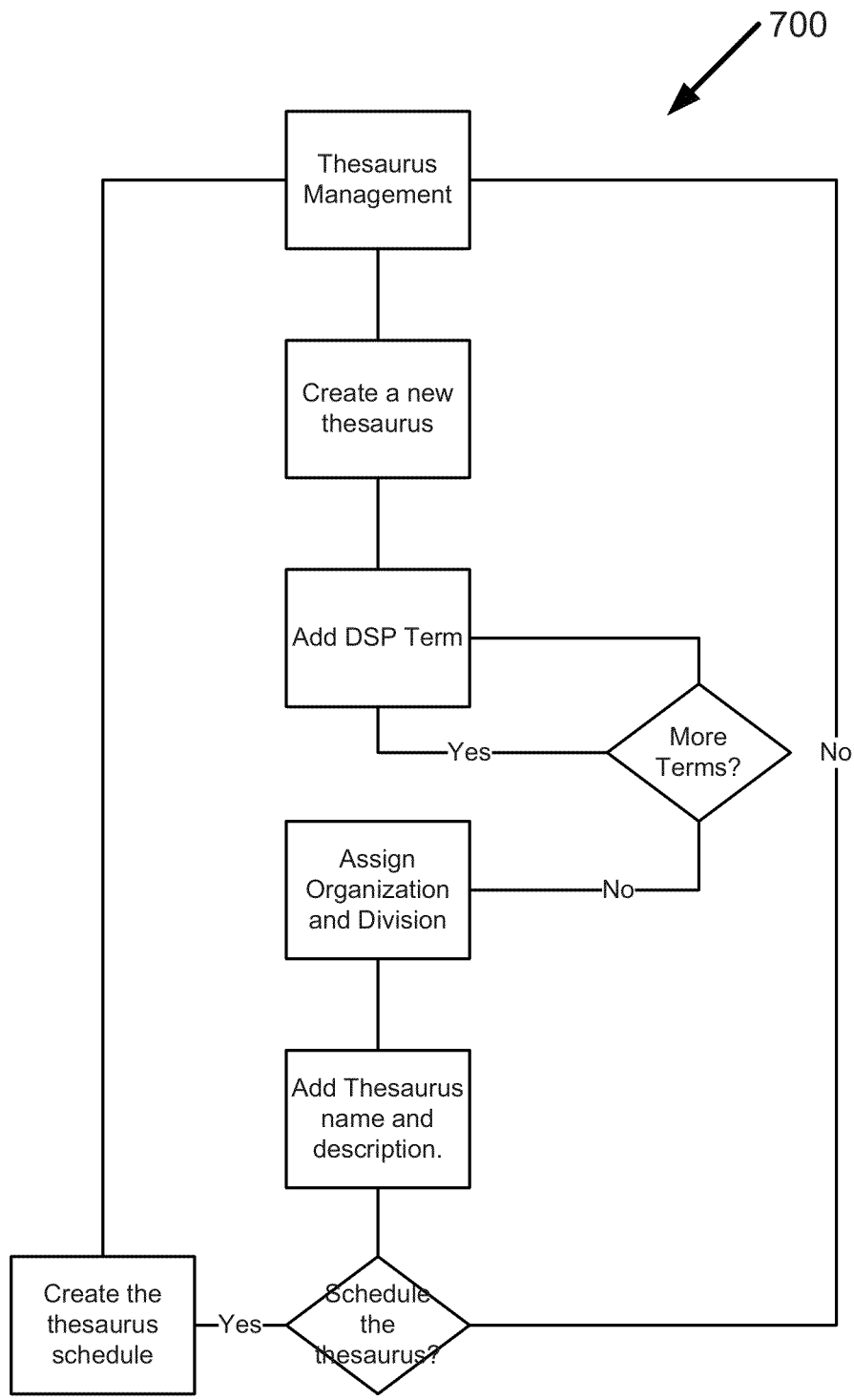
FIG. 7 is a flow chart of an example process for managing thesauri.

FIG. 7 shows an example process 700 for creating and updating (managing) a thesaurus. A thesaurus, also referred to as a digital signature profile (DSP) list, is a list of search terms that are applied to a customer/organization or set of customers/organizations. According to one convenient embodiment, the system creates and updates the thesaurus (or thesauri) associated with an organization using a contact management feature, which is described below.

Figure 8:
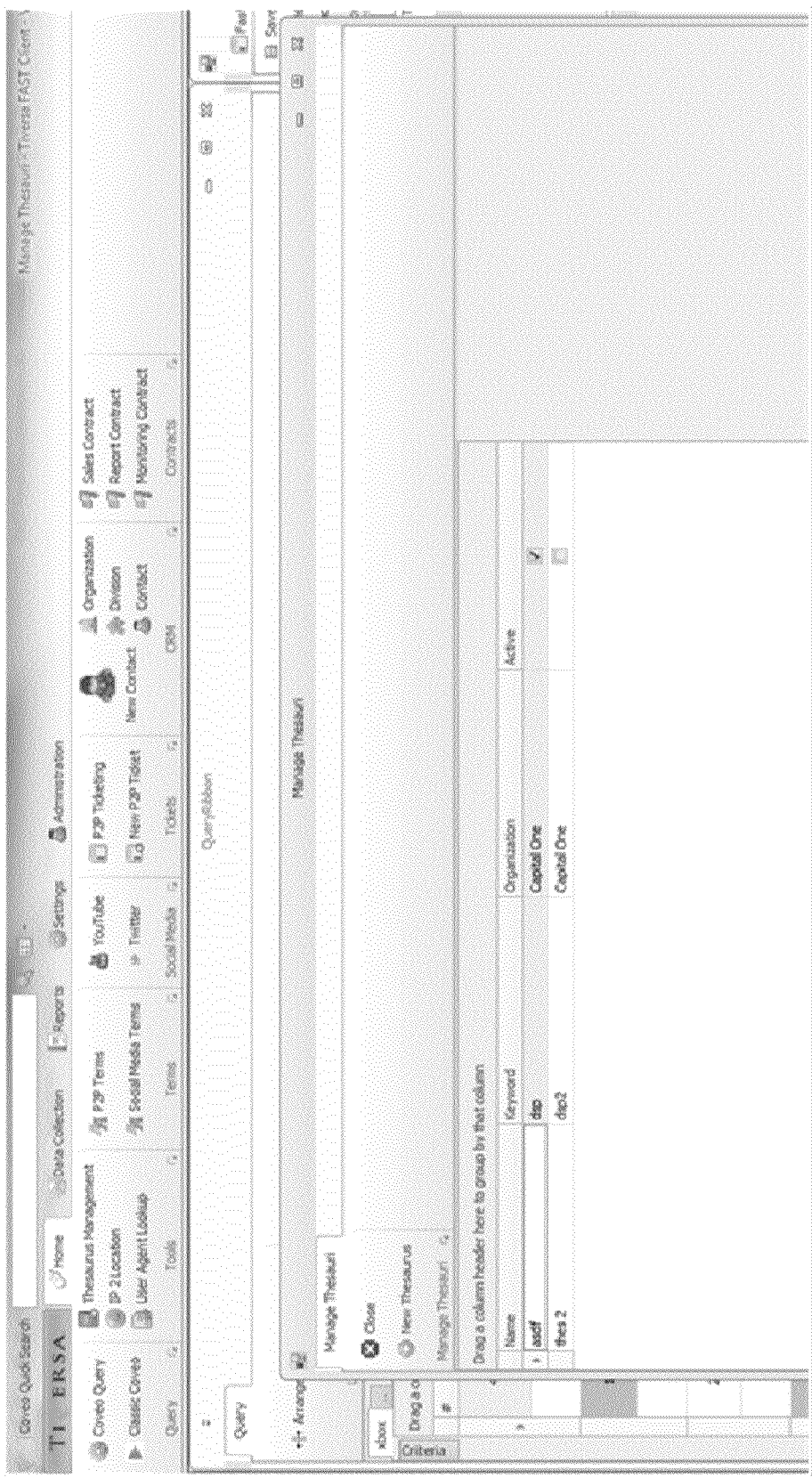
FIG. 8 is a screenshot of an example user interface for managing thesauri.

FIG. 8 shows a screenshot of an example user interface 800 for managing a thesaurus or thesauri.

Figure 9:
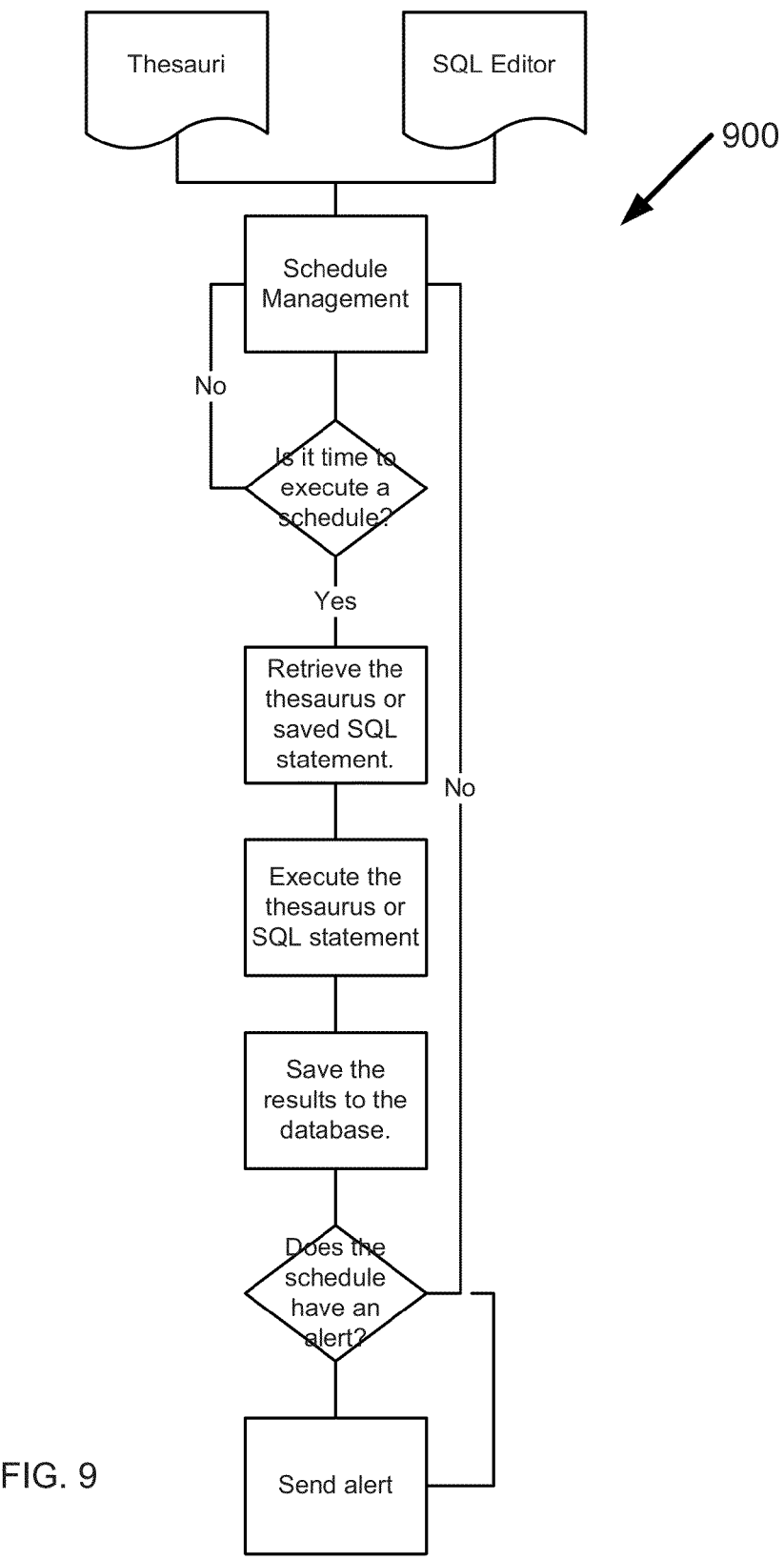
FIG. 9 is a flow chart of an example process for scheduling collection of unstructured data.

FIG. 9 shows an example process 900 for scheduling the collection of unstructured data. The scheduled automation of FIG. 9 allows a cyber forensic analyst (CFA) to set a predefined schedule for the system to execute a thesaurus-based search. Results (e.g., virtual profiles) are saved for review at the leisure of the CFA. Additionally, the system can alert the CFA that new results are ready for review.

In practice, the schedule automation may be set up such that every 24 hours (or other appropriate period of time), the system executes a thesaurus-based search of the Internet (and/or other information sources) for unstructured data. The system then creates and/or updates virtual profiles from data collected, as described above in reference to FIG. 3. The system provides the CFA with information from the last 24 hours to analyze. The foregoing automation may be the basis for a mechanism for monitoring for suspicious or illegal activities.

In another convenient embodiment, the schedule automation also schedules the execution of saved SQL queries (e.g., those queries created in SQL editor by the CFA).

Figure 10A:
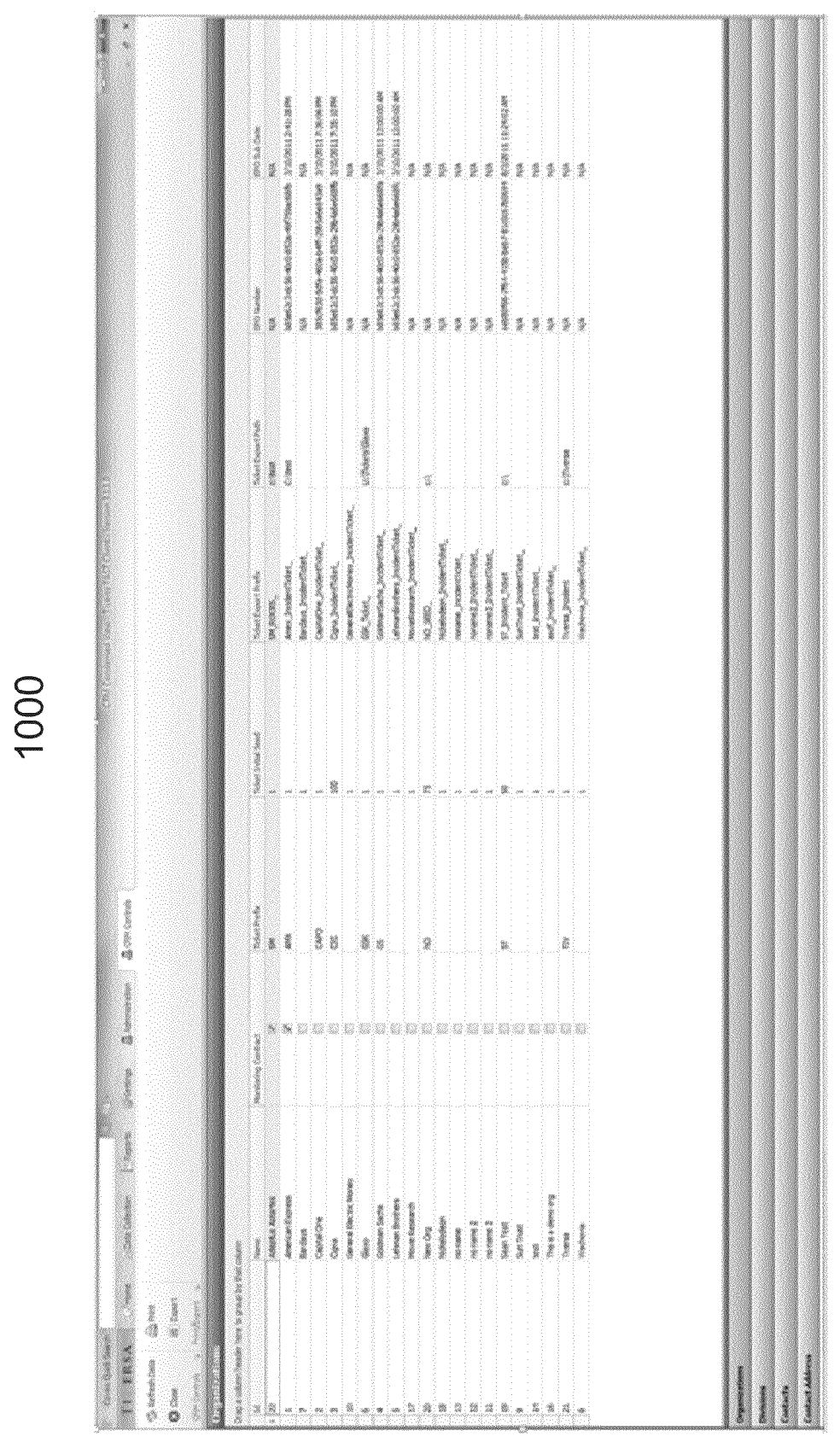
Figure 10B:
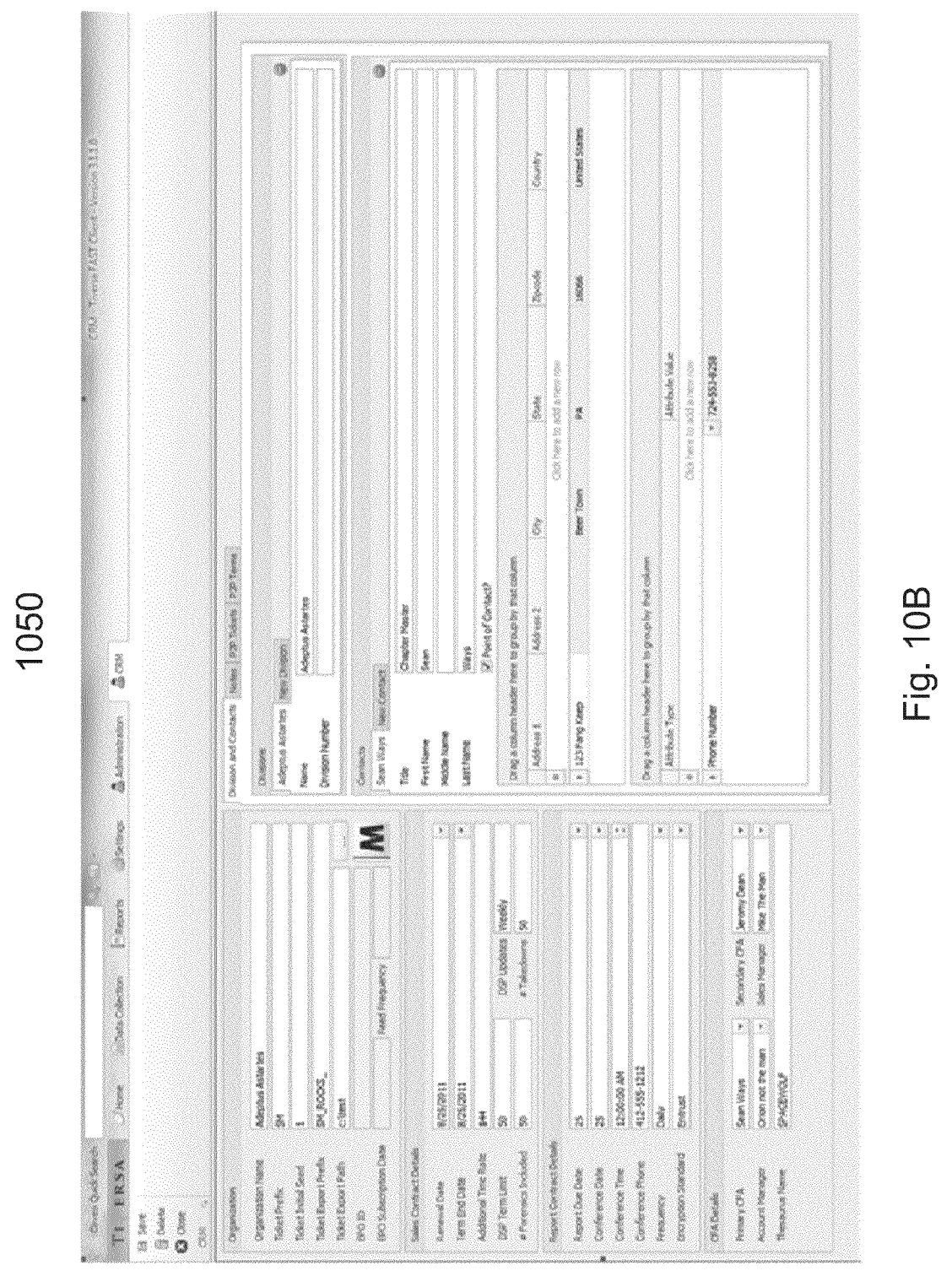

In one convenient embodiment, the system uses a contact management feature to add, remove or edit companies, divisions, and contacts that are used to manage the operation of the system. For example, results produce by the system may separated by company and division. FIGS. 10A and 10B show screenshots of example user interfaces 1000 and 1050 for managing contacts.

Figure 11:
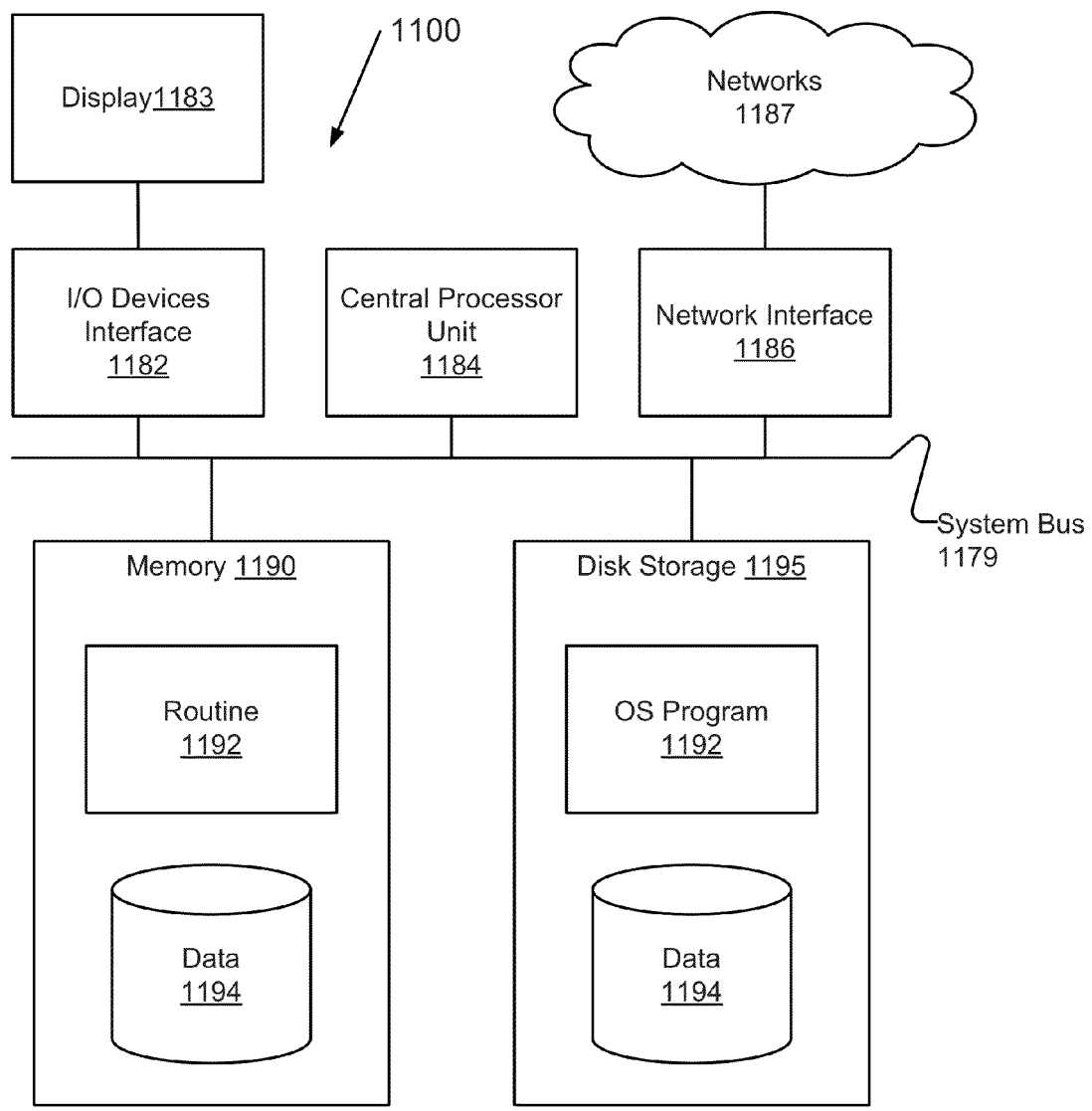
FIG. 11 is a block diagram of an example computer to implement the example embodiments.

FIG. 11 is a block diagram of the internal structure of a computer 1100 in which various example embodiments may be implemented. The computer 1100 contains system bus 1179, in which a bus is a set of hardware lines used for data transfer among the components of a computer or processing system. Bus 1179 is essentially a shared conduit that connects different elements of a computer system (e.g., processor, disk storage, memory, input/output ports, network ports, etc.) that enables the transfer of information between the elements.

Attached to system bus 1179 is I/O device interface 1182 for connecting various input and output devices (e.g., keyboard, mouse, displays, printers, speakers, etc.) to the computer 1100. For example, the I/O device interface 1182 connects the computer 1100 to a display 1183. The display 1183 presents a results screen of information (such as the results screen 400 of FIG. 4) among other things, to a cyber forensic analyst. The analyst then reviews the information and identifies suspicious or illegal activities, as described above.

Network interface 1186 allows the computer 1100 to connect to various networks 1187 (e.g., the World Wide Web, and peer-to-peer and social media networks 305 of FIG. 3) and devices attached to those networks.

Memory 1190 provides volatile storage for computer software instructions 1192 and data 1194 used to implement an example embodiment (e.g., the procedure 300 of FIG. 3). Disk storage 1195 provides non-volatile storage for computer software instructions 1192 and data 1194 used to implement an example embodiment. Central processor unit 1184 is also attached to system bus 1179 and provides for the execution of computer instructions.

In one embodiment, the processor routines 1192 and data 1194 are a computer program product (generally referenced 1192), including a computer readable medium (e.g., a removable storage medium, such as one or more DVD-ROM's, CD-ROM's, diskettes, tapes, etc.) that provides or stores at least a portion of the software instructions for example embodiments. Computer program product 1192 can be installed by any suitable software installation procedure, as is well known in the art. In another embodiment, at least a portion of the software instructions may also be downloaded over a cable, communication and/or wireless connection.

Further, example embodiments may be implemented in a variety of computer architectures. The general computer of FIG. 11 is for purposes of illustration and not limitation of any embodiments.

While the example embodiments have been particularly shown and described with references to examples thereof, it will be understood by those skilled in the art that various changes in form and details may be made therein without departing from the scope encompassed by the appended claims.

What is claimed is:

1. A system comprising:
   a network interface configured to communicate with a plurality of information sources over one or more networks; and
   a processor coupled to the one or more network interfaces, the processor configured to:
      collect unstructured data from the plurality of information sources;
      parse the unstructured data for personal identifiable information associated with an entity;
      identify a source address identifier for an information source, of the plurality of information sources, from where the personal identifiable information was collected;
      determine to either create a new virtual profile for the entity to store the personal identifiable information or update an existing virtual profile to store the personal identifiable information based on the source address identifier for the information source from where the personal identifiable information was collected; and
      record the personable identifiable information in a virtual profile associated with the entity based on the determination, wherein a relationship is formed between multiple virtual profiles created for the entity using one or more points of commonality between the multiple virtual profiles, and where each of the multiple virtual profiles for the entity has a different source address identifier based on each information source that is assigned a new source address identifier.

2. The system of claim 1 wherein the entity is one of a person, organization, location, and idea.

3. The system of claim 1 wherein the processor is further configured to collect the unstructured data from the plurality of information sources using a search term stored in a thesauri.

4. The system of claim 1 wherein the personal identifiable information is at least one of a name, address, credit card number, bank account number, health insurance number, driver's license number, email address, social security number, and a birthday.

5. The system of claim 1 wherein the personal identifiable information is utilized to locate other personal identifiable information in a subsequent step that identifies the virtual profile associated with the entity.

6. The system of claim 5 wherein the personal identifiable information is a social security number and the other personal identifiable information is a name associated with the social security number.

7. The system of claim 1 wherein the processor is further configured to:
   create an orphan list that includes the personal identifiable information when the personal identifiable information cannot be associated with any entity.

8. The system of claim 1 wherein the virtual profile is written to a data store.

9. The system of claim 8 wherein the data store is a Structured Query Language (SQL) database.

10. The system of claim 1 wherein the processor is further configured to:
    form other relationships between the virtual profile and other virtual profiles associated with other entities using one or more other points of commonality.

11. The system of claim 10 wherein the one or more other points of commonality are at least one of a common interest, geographical location, demographic, and financial information.

12. The system of claim 11 wherein the other relationships between the virtual profile and each of the other virtual profiles is ranked based on relatedness between the virtual profile and the other virtual profiles.

13. The system of claim 12 wherein the relatedness is based on a number of points of commonality between the virtual profile and the other virtual profiles.

14. The system of claim 10 wherein the processor is further configured to:
execute a search against a plurality of virtual profiles consisting of at least the virtual profile and the other virtual profiles;
utilize the plurality of virtual profiles with the other relationships; and
obtain a result set that includes information that is a subject of the search and other information that is related to the search to identify a specific entity associated with a data breach.

15. The system of claim 14 wherein the processor is further configured to:
display the information and the other information so that a cyber forensic analyst may identify the specific entity associated with the data breach.

16. The system of claim 14 wherein the processor is further configured to:
display an aggregate of virtual profiles that match the search, wherein the aggregate of virtual profiles are ranked based on a relevancy between the search and each virtual profile of the aggregate of virtual profiles; and
receive input from a cyber forensic analyst indicating a specific virtual profile, from the aggregate of virtual profiles, is associated with the specific entity.

17. The system of claim 16 wherein the processor is further configured to:
generate a ticket for one or more virtual profiles of the aggregate of virtual profiles to indicate a potential data breach.

18. The system of claim 17 wherein the processor is further configured to:
monitor each of the one or more virtual profiles to determine if the data breach has reoccurred or has expanded; and
generate an alert, in response to determining that the data breach has reoccurred or has expanded.

19. The system of claim 1 wherein the source address identifier is an IP address.

20. The system of claim 1 wherein the existing virtual profile is updated if the source address identifier is assigned with the existing virtual profile and the new virtual profile is created if the source address identifier is not assigned with the existing virtual profile.

21. The system of claim 1 wherein the processor is configured to:
scan the multiple virtual profiles that share the one or more points of commonality for the entity utilizes one or more search terms;
determine that the entity is participating in illegal activity based on the one or more search terms matching data stored in at least one virtual profile of the multiple virtual profiles that share the one or more points of commonality for the entity.

22. A method, comprising:
connecting, over one or more computer networks, to a plurality of information sources;
collecting, by a processor, unstructured data from the plurality of information sources;
parsing the unstructured data for personal identifiable information; and
identifying a source address identifier for an information source, of the plurality of information sources, from where the personal identifiable information was collected;
determining to either create a new virtual profile for the entity to store the personal identifiable information or update an existing virtual profile to store the personal identifiable information based on the source address identifier for the information source from where the personal identifiable information was collected; and
recording the personable identifiable information in a virtual profile associated with the entity based on the determination, wherein a relationship is formed between multiple virtual profiles created for the entity using one or more points of commonality between the multiple virtual profiles, and where each of the multiple virtual profiles for the entity has a different source address identifier based on each information source that is assigned a new source address identifier.

23. The method of claim 22 wherein the entity is one of a person, organization, location, and idea.

24. The method of claim 22 further comprising:
collecting the unstructured data from the plurality of information sources using a search term stored in a thesauri.

25. The method of claim 22 wherein the personal identifiable information is at least one of a name, address, credit card number, bank account number, health insurance number, driver's license number, email address, social security number, and a birthday.

26. The method of claim 22 wherein the personal identifiable information is utilized to locate other personal identifiable information in a subsequent step that identifies the virtual profile associated with the entity.

27. The method of claim 26 wherein the personal identifiable information is a social security number and the other personal identifiable information is a name associated with the social security number.

28. The method of claim 22 further comprising:
creating an orphan list that includes the personal identifiable information when the personal identifiable information cannot be associated with any entity.

29. The method of claim 22
wherein the multiple virtual profiles are created for the entity as a result of an IP shift.

30. The method of claim 22 wherein the virtual profile is written to a data store.

31. The method of claim 30 wherein the data store is a Structured Query Language (SQL) database.

32. The method of claim 22 further comprising:
forming other relationships between the virtual profile and other virtual profiles associated with other entities using one or more other points of commonality.

33. The method of claim 32 wherein the one or more other points of commonality are at least one of a common interest, geographical location, demographic, and financial information.

34. The method of claim 33 wherein the relationship between the virtual profile and each of the other virtual profiles is ranked based on relatedness between the virtual profile and the other virtual profiles.

35. The method of claim 34 wherein the relatedness is based on a number of points of commonality between the virtual profile and the other virtual profiles.

36. The method of claim 32 further comprising:

executing a search against a plurality of virtual profiles consisting of at least the virtual profile and the other virtual profiles;

utilizing the plurality of virtual profiles with the other relationships; and obtaining a result set that includes information that is a subject of the search and other information that is related to the search to identify a specific entity associated with a data breach.

37. The method of claim 36 further comprising:

displaying the information and the other information so that a cyber forensic analyst may identify the specific entity associated with the data breach.

38. The method of claim 36 further comprising:

displaying an aggregate of virtual profiles that match the search, wherein the aggregate of virtual profiles are ranked based on a relevancy between the search and each virtual profile of the aggregate of virtual profiles; and receiving input from a cyber forensic analyst indicating a specific virtual profile, from the aggregate of virtual profiles, is associated with the specific entity.

39. The method of claim 38 further comprising:

generating a ticket for one or more virtual profiles, of the aggregate of virtual profiles, to indicate a potential data breach.

40. The method of claim 39 further comprising:

monitoring each of the one or more virtual profiles to determine if the data breach has reoccurred or has expanded; and generating an alert, in response to determining that the data breach has reoccurred or has expanded.

41. A system comprising:

a network interface configured to communicate with a plurality of information sources over one or more networks; and a processor coupled to the one or more network interfaces, the processor configured to:

collect unstructured data from the plurality of information sources;

parse the unstructured data for personal identifiable information associated with an entity;

identify a source address for an information source, of the plurality of information sources, from where the personal identifiable information was collected;

search a plurality of existing virtual profiles;

determine, based on the search, if an existing virtual profile exists for the source address, where the existing virtual profile stores other personal identifiable information associated with the entity;

update the existing virtual profile by storing the personal identifiable information in the existing virtual profile if the existing virtual profile exists for the source address; and create a new virtual profile for the entity and store the personal identifiable information in the new virtual profile if the existing virtual profile does not exist for the source address, wherein a relationship is formed between multiple virtual profiles created for the entity using one or more points of commonality between the multiple virtual profiles, and where each of the multiple virtual profiles for the entity has a different source address identifier based on each information source that is assigned a new source address identifier.

42. The system of claim 41 wherein the source address is an IP address.

* * * * *